United States Patent [19]

Bonk et al.

[11] Patent Number: 5,089,571
[45] Date of Patent: Feb. 18, 1992

[54] REGENERATED, HIGH MOLECULAR WEIGHT, THERMOPLASTIC RESINS AND PROCESS FOR REGENERATING THERMOPLASTIC RESINS

[75] Inventors: Henry W. Bonk, Wallingford; Augustin T. Chen, Cheshire, both of Conn.; Benjamin S. Ehrlich, League City, Tex.

[73] Assignee: The Dow Chemical Company, Midland, Mich.

[21] Appl. No.: 623,487

[22] Filed: Dec. 4, 1990

[51] Int. Cl.$^5$ .............................................. C08L 75/04
[52] U.S. Cl. ...................................... 525/457; 525/458
[58] Field of Search ................................ 525/457, 458

[56] References Cited

U.S. PATENT DOCUMENTS

| 2,937,151 | 5/1960 | Ten Broeck et al. | 260/2.3 |
| 3,738,946 | 6/1973 | Frulla et al. | 260/2.3 |
| 4,129,611 | 12/1978 | Heiss | 260/858 |
| 4,339,358 | 7/1982 | Schutz | 521/49.5 |
| 4,822,827 | 4/1989 | Bonk et al. | 521/170 |

FOREIGN PATENT DOCUMENTS 9040590 4/1979 Japan .

Primary Examiner—Maurice J. Welsh

[57] ABSTRACT

High molecular weight thermoplastic polyurethane resins with narrow molecular weight distribution and good physical properties are prepared by regenerating thermally degraded and/or off-grade thermoplastic polyurethane resins. The regenerated high molecular weight thermoplastic polyurethane resins do not present any processing difficulties inherent to high molecular weight resins.

4 Claims, No Drawings

REGENERATED, HIGH MOLECULAR WEIGHT, THERMOPLASTIC RESINS AND PROCESS FOR REGENERATING THERMOPLASTIC RESINS

BACKGROUND OF THE INVENTION

The present invention relates to regenerated, high molecular weight, thermoplastic polyurethane resins and to a process for regenerating thermally degraded and/or off-grade, thermoplastic polyurethane resins.

One of the most significant problems related to the thermoplastic polyurethane technology, either thermoplastic polyurethane engineering plastics or elastomers, is the large amount of waste materials. These waste materials comprise either thermally degraded resins, scrap or misformulated resins. These polymeric materials, which have a low molecular weight, heretofore could not be regenerated and were normally considered waste material. However, it has become common practice, for example, to chop scrap into small pieces and blend them back into a virgin resin at appropriate ratios. Only a limited amount, typically 10 percent, of this regrind can be used without any severe property losses.

The problem associated with using the regrind together with a virgin resin in most thermoplastic materials is that the resulting resin will have a broader molecular weight distribution than the virgin resin. This broader molecular weight distribution causes it to have inferior properties as compared to the virgin resin.

Still another problem is that the higher the molecular weight of a thermoplastic polyurethane resin, the better its physical properties. However, the higher the molecular weight the more processing difficulties appear, such as, to cause a high melt viscosity during processing. Thus, the conventional molecular weight range for thermoplastic polyurethanes varies between 125,000 and 350,000. Upon using this molecular weight range, parts possessing acceptable physical properties are prepared without undue processing difficulties.

It would, therefore, be most desirable, from an economic, environmental and commercial standpoint, to provide a process for regenerating higher molecular weight thermoplastic polyurethane plastics and elastomers with a narrow molecular weight distribution and good physical properties from degraded or off-grade thermoplastic polyurethane resins, which do not present the processing difficulties inherent to high molecular weight resins.

SUMMARY OF THE INVENTION

In one aspect, this invention is a physical blend of thermoplastic polyurethane resins comprising 1) a thermoplastic polyurethane resin having free isocyanate groups and a molecular weight of from about 100,000 to about 200,000 with 2a) an off-grade thermoplastic polyurethane resin having free active hydrogen groups and having a molecular weight of from about 30,000 to about 150,000; and/or 2b) a degraded thermoplastic polyurethane resin having a molecular weight of from about 30,000 to about 150,000, wherein the ratio between ingredient 1) to 2) is from about 0.25:1 to about 5:1.

In another aspect, this invention is a regenerated, high molecular weight, thermoplastic polyurethane resin with narrow molecular weight distribution and good physical properties prepared by thermally processing the blend of the first aspect.

Still another aspect of the present invention is a process for preparing high molecular weight molded polyurethanes using low molecular weight resins which have better melt flow properties. The process comprises thermally processing the blend of the first aspect, at a ratio of ingredient 1) to 2) of from about 0.25:1 to about 5:1, under conditions suitable to produce high molecular weight parts.

The present invention thus provides a means of regenerating unacceptable thermoplastic polyurethanes, thereby reducing waste disposal problems previously encountered with these materials and allowing manufacturers to recover value from materials previously thought to be useless.

DETAILED DESCRIPTION OF THE INVENTION

The degraded or off-grade resins employed in present invention may be any thermoplastic polyurethane resins having a molecular weight of from about 30,000 to about 150,000. Molecular weight as used herein refers to molecular weight values measured by gel permeation chromatography (GPC) based on polystyrene standards.

Thermoplastic polyurethane resins are generally prepared by reacting substantially difunctional polyisocyanates and an active hydrogen containing compound having a functionality not greater than 2 and, optionally, difunctional chain extenders.

Any of the organic diisocyanates and polyisocyanates previously employed in the preparation of polyurethanes can be employed to prepare the starting thermoplastic polyurethane resins useful in the present invention. A preferred group of polyisocyanates comprises the aromatic diisocyanates, the aliphatic diisocyanates, the cycloaliphatic diisocyanates and mixtures thereof.

Illustrative isocyanates and respective amounts, but non-limiting thereof, are those disclosed, for example, in U.S. Pat. No. 4,822,827, which is incorporated herein by reference. Preferred isocyanates include 2,4- and/or 2,6-toluene diisocyanate (TDI), methylene diphenyl diisocyanate (MDI), more preferably hexamethylene diisocyanate (HMDI) and hydrogenated methylene diphenyl diisocyanate ($H_{12}MDI$).

Suitable high molecular weight, active hydrogen containing compounds, commonly referred to as polyols, which can be employed in present invention to prepare the starting polyurethane resins include polyether polyols, polyester polyols, hydroxy-terminated polycarbonates, hydroxy-terminated polybutadienes, hydroxy-terminated polybutadiene-acrylonitrile copolymers, hydroxy-terminated copolymers of dialkyl siloxane and alkylene oxides, such as ethylene oxide, propylene oxide and the like, and mixtures of any of the above polyols with amine-terminated polyethers and amine-terminated polybutadiene-acrylonitrile copolymers.

Typically, the polyols employed for preparing thermoplastic polyurethanes include those having a functionality not greater than 2 and a molecular weight from about 500 to about 20,000, preferably from about 1,000 to about 10,000, most preferably from about 600 to about 6,000.

Illustrative polyethers, polyesters and amines, and respective amounts, but non-limiting thereof, are those disclosed, for example, in above-mentioned U.S. Pat. No. 4,822,827.

Suitable chain extenders, when employed, include those conventionally employed in the preparation of thermoplastic polyurethanes. Suitable chain extenders include those a molecular weight in the range of from 60 to about 400, preferably 65 to 250, and having at least 2 active hydrogen groups.

Illustrative chain extenders, but non-limiting thereof, are those disclosed, for example, in above-mentioned U.S. Pat. No. 4,822,827. Exemplary chain extenders which may be employed in the present invention include ethylene glycol, butanediol, 1,6-hexanediol, 1,9-nonanediol, cyclohexanediol, cyclohexane dimethanol, dicyclopentanediol, aromatic amines, such as DETDA, hydrogenated bisphenol A, 4,4'-dicyclohexanediol and the like.

To prepare the starting polyurethane resins, it is frequently desirable, but not essential, to include a suitable catalyst in the reaction mixture employed to prepare the conventional thermoplastic polyurethane resins. Any of the catalysts conventionally employed in the art to catalyze the reaction of an isocyanate with an active hydrogen containing compound can be employed for this purpose. A detailed listing of such catalysts and respective amounts is to be found, for example, in U.S. Pat. No. 4,202,957, which is incorporated herein by reference. Typically, the amount of catalyst employed is from 0-0.5 weight percent.

However, one critical aspect in preparing high molecular weight thermoplastic polyurethanes, is the ratio between isocyanate groups and active hydrogen groups, commonly called isocyanate (NCO) index. The NCO index, typically, should be of from about 0.96 to about 1.04, preferably from about 0.98 to about 1.02, most preferably from about 0.99 to 1.01.

If the NCO index is not within the above defined range, i.e., below 0.96 or above 1.04, or even outside of the less preferred ranges, the resultant polymer will exhibit a low average molecular weight rendering it unacceptable or less desirable for further use.

An "off-grade resin" is the result of errors in stoichiometry on manufacturing high molecular weight thermoplastic polyurethanes, resulting in resins having either a NCO index below about 0.98 or above about 1.02, preferably below about 0.96 and above about 1.04. Thus, an off-grade resin may have either free active hydrogen groups or free isocyanate groups.

By "degraded resin" is meant a thermoplastic polyurethane resin which was thermally treated for a too long time period or at a too high temperature or thermally processed in the presence of moisture thereby causing the breaking of the long polymeric backbone into smaller fractions. Typically, degraded resin comprises scrap, such as runners, trim, and the like.

In both cases above, the resins have a low molecular weight, therefore being unacceptable resins.

The thermoplastic polyurethane resins useful in the present invention may also include various reinforcing agents or fillers, such as fiberglass, talc and the like. They can also contain additives, such as antioxidants, pigments, fire retardants, plasticizers, wax lubricants and the like which are useful in the polyurethane art.

The proportions for the reinforcing agents and fillers are advantageously from about 0 to about 60 percent by weight and for the additives from about 0 to about 5 percent by weight.

The individual components used to prepare the starting polyurethane resins are preferably rendered substantially free from the presence of moisture. When moisture is present, the molecular weight of the parts formed from it is severely reduced. Furthermore, the parts may show splaying caused by the reaction of water with the isocyanate to generate $CO_2$.

By "thermally processing" is meant to subject the resin to heating conditions sufficient to melt the resin and subsequently mold it.

The high molecular thermoplastic polyurethane resins of this invention can be prepared using any of the methods employed in the polyurethane art. These methods include manual, mechanical or static mixing means, injection molding, extrusion and the like. Typical preparation methods and conditions for thermoplastic polyurethane resins may be found in U.S. Pat. Nos. 3,376,834 and 4,567,236, which are incorporated herein by reference.

The regenerated thermoplastic polyurethane resins resultant from the regeneration process of the present invention have a high average molecular weight, i.e., greater than about 200,000, preferably of greater than about 250,000, more preferably greater than 350,000, most preferably greater than 500,000.

In addition, the regenerated thermoplastic polyurethane resins of present invention exhibit excellent physical properties, such as, for example, good tensile strength, impact strength and elongation.

The high molecular weight thermoplastic polyurethane resins of present invention are useful in many different areas, such as fabrication of medical devices, automobile body parts, equipment housings, mechanical goods, gears, gaskets, and a wide variety of other articles calling for high impact resistance and good tensile properties.

ILLUSTRATIVE EMBODIMENTS

The following examples are given to illustrate the invention and should not be interpreted as limiting it in any way. Unless stated otherwise, all parts and percentages are given by weight.

EXAMPLE 1

A. Preparation of TPU Having Free NCO-Reactive Groups

A mixture is prepared from 86.5 parts by weight of 1,4-cyclohexanedimethanol, 47.3 parts by weight of 1,6-hexanediol, 15.5 parts by weight of poly(tetramethylene oxide) glycol having a equivalent weight (EW) of 325 (Terathane 650 from DuPont de Nemours), 0.47 parts by weight of a commercial antioxidant from Ciba Geigy and 0.57 parts by weight of tris-nonylphenylphosphite. This mixture is heated to 210° F. (98.9° C.) and dehydrated under vacuum for two hours. This mixture is pumped to a twin screw extruder. Melted methylene diphenyldi-isocyanate (MDI) is pumped to the extruder at a ratio of 163.2 g for every 100 g of diol mixture. An organotin catalyst is pumped to the extruder at the rate of 0.019 parts per 100 g of diol mixture. The extruder was maintained at 220°±5° C. The resultant NCO index of the components is measured as 0.955. The extrudate was allowed to cool onto a metal conveyor belt and diced into pellets. After drying at 240° F. (115.6° C.), a representative sample of the pellets is injection molded into test specimens using a three-zone, three-ounce, injection molding machine.

The molecular weight of the injection molded parts is listed in Table 1, and the physical properties are summarized in Table 2.

B. Preparation of TPU Having Free NCO Groups

The procedure of Example 1A is repeated, except 180.8 g of melted MDI are employed for every 100 g of diol mixture and 0.018 parts by weight of the diol mixture of the catalyst (Fomrez UL-22) is used. The NCO index of the resin is measured as 1.058. The molecular weight of the injection molded parts is listed in Table 1, and the physical properties are summarized in Table 2.

C. Preparation of High Molecular Weight TPU

A physical blend was prepared from 790 g of resin prepared as Example 1A and 800 g of resin prepared as Example 1B. The resultant NCO index of this blend is approximately 1. This blend is dried at 240° F. (115.6° C.) and injection molded. The molecular weight of the injection molded parts is listed in Table 1, and the physical properties are summarized in Table 2.

Another blend is prepared with same composition as mentioned above. After drying at 240° F. (115.6° C.), it is injection molded. The melt indexes for Examples 1A–C are given in Table 3. The screw torque needed during the feed cycle of the injection molding process using the four-zone, ten-ounce, Reed Prentice injection molding machine, and the molecular weight of the molded parts are summarized in Table 8.

TABLE 1

| | Molecular Weight of Thermoplastic Polyurethane | |
|---|---|---|
| Example | NCO Index | $\bar{M}w$ |
| 1A* | 0.955 | 95,891 |
| 1B* | 1.058 | 174,889 |
| 1C | #1A*/#1B* (1) | 654,798 |

*Not an example of this invention

TABLE 2

| | Physical Properties of Thermoplastic Polyurethane | | | | |
|---|---|---|---|---|---|
| Example | T. S. Yield psi | Elong. Yield (%) | T. S. Break psi | Elong. Break (%) | Notched Izod ¼" |
| 1A* | 9,766 | 6 | 9,766 | 6 | 0.18 |
| 1B* | 10,018 | 6 | 8,430 | 62 | 1.27 |
| 1C | 9,480 | 7 | 8,365 | 66 | 1.34 |

*Not an example of this invention

TABLE 3

| | Melt Flow Properties of Thermoplastic Polyurethane | |
|---|---|---|
| Example | Molecular Weight of Molded Part $\bar{M}w$ | Melt Index (g/10 min) 8700 g, 224° C. |
| 1A* | 95,891 | 62.6 |
| 1B* | 174,889 | 4.2 |
| 1C | 654,798 | 10.7 |

*Not an example of this invention

As apparent from the data in Table 1 above, the regenerated thermoplastic polyurethane resin of the present invention, obtained from off-grade resins, exhibits a significantly higher molecular weight. Furthermore, Tables 2 and 3 show that this high molecular weight resin exhibits comparable or better physical properties as compared to the off-grade resins alone.

EXAMPLE 2

A. Preparation of a Virgin TPU Resin

Example 1A is repeated, except using 0.49 part by weight of 1-octanol and a ratio of 171.9 g of melted MDI for every 100 g of diol mixture. The NCO index of the resultant virgin resin is approximately 1. The molecular weight of the injection molded parts is listed in Table 4, and the physical properties are summarized in Table 5.

B. Preparation of Degraded TPU Resin

The virgin resin prepared in Example 2A above is purposely thermally degraded for later regeneration. Thus, 2.27 kg of resin as prepared in Example 2A with moisture content of 0.062% by weight are degraded by injection molding without drying using a four-zone, ten-ounce, Reed Prentice injection molding machine. The temperatures of each heating zone are: first, 350° F. (176.7° C.); second, third and fourth, 410° F. (210° C.). The molecular weight of the injection molded parts is listed in Table 4, and the physical properties are summarized in Table 5.

C. Preparation of High Molecular Weight TPU

In this example, a mixture of a degraded resin and an off-grade resin is prepared for regeneration purposes. Four hundred grams of the parts obtained in Example 2B are chopped into small pieces and then blended with 500 g of resin prepared as Example 1B. The NCO index of the resultant mixture is approximately 1. This blend is dried at 240° F. (115.6° C.) and injection molded using a three-zone, three-ounce, Arburg 221E injection molding machine. The molecular weight of the injection molded parts is listed in Table 4, and the physical properties are summarized in Table 5.

TABLE 4

| | Molecular Weight of Thermoplastic Polyurethane | |
|---|---|---|
| Example | NCO/OH Index | $\bar{M}w$ |
| 2A* | 1.005** | 347,525 |
| 2B* | ND | 135,640 |
| 1B* | 1.058 | 174,889 |
| 2C | #2B*/#1B* (1) | 673,175 |

*Not an example of this invention
**virgin resin
ND = not determined

TABLE 5

| | Physical Properties of Thermoplastic Polyurethane | | | | |
|---|---|---|---|---|---|
| Example | T. S. Yield psi | Elong. Yield (%) | T. S. Break psi | Elong. Break (%) | Notched Izod ¼" |
| 2A* | 9,000 | 7.0 | 8,000 | 60 | 1.2 |
| 2B* | 4,343 | 1.6 | 4,434 | 1.6 | 0.25 |
| 1B* | 10,018 | 6 | 8,430 | 62 | 1.27 |
| 2C | 10,275 | 7.1 | 7,853 | 23 | 1.47 |

*Not an example of this invention

As apparent from the data in Table 4 above, the regenerated thermoplastic polyurethane resin of the present invention, obtained from a mixture of degraded TPU resin and a TPU resin having free NCO groups, exhibits a significantly higher molecular weight. Furthermore, Table 5 shows that this high molecular weight resin exhibits comparable or better physical properties as compared to the virgin, degraded or off-grade resin alone.

EXAMPLE 3

A. Preparation of TPU Elastomer having free NCO-Reactive Groups

A mixture is prepared from 100 parts by weight of a poly(tetramethylene oxide) glycol (Terathane 1000 from DuPont de Nemours) EW 500, 20.7 part by weight of 1,4-butanediol, 0.12 part by weight of a commercial lubricant from Ross Co., and 0.12 part of a commercial antioxidant from Ciba Geigy. This mixture is then heated to 210° F. (98.9° C.) and dehydrated under vacuum for two hours. This mixture is pumped to a twin screw extruder. Melted MDI is pumped to the extruder at a rate of 65.1 g per 100 g of diol mixture. The NCO index of this mixture is measured as about 0.95. The catalyst (a 50/50 by weight mixture of stannous octoate/dioctyl phthalate) is pumped to the extruder at the rate of 0.03 parts per 100 g of diol mixture. The extruder was maintained at 220°±5° C. The extrudate was allowed to cool onto a metal conveyor belt and diced. After drying at 190° F. (87.8° C.), a representative sample of the pellets is injection molded into test specimens using a four-zone, five-ounce, HPM injection molding machine.

The molecular weight of the injection molded parts is listed in Table 6, and the physical properties are summarized in Table 7.

B. Preparation of TPU Elastomer having Free NCO Groups

Example 3A is repeated, except for using 72.5 g of melted MDI per 100 g of diol mixture. The resultant NCO index of this mixture is measured as about 1.06. The molecular weights of the injection molded parts are listed in Table 6, and the physical properties are summarized in Table 7.

C. Preparation of High Molecular Weight TPU Elastomer

A physical blend is prepared from 600 g of resin prepared as Example 3A and 600 g of resin prepared as Example 3B. This blend is dried at 190° F. (87.7° C.) and injection molded using a four-zone HPM injection molding machine. The molecular weight of the injection molded parts is listed in Table 6, and the physical properties are summarized in Table 7.

TABLE 6

| | Molecular Weight of Thermoplastic Polyurethane Elastomer | |
|---|---|---|
| Example | NCO/OH Index | Mw |
| 3A* | 0.95 | 94,558 |
| 3B* | 1.06 | 191,147 |
| 3C | #3A*/#3B* (1/1) | 456,880 |

*Not an example of this invention

TABLE 7

| | Physical Properties of Thermoplastic Polyurethane Elastomer | |
|---|---|---|
| Example | T. S. Break psi | Elong. Break (%) |
| 3A* | 3060 | 570 |
| 3B* | 5490 | 400 |
| 3C | 7010 | 530 |

*Not an example of this invention

As apparent from the data in Table 6 above, the regenerated thermoplastic polyurethane resin of the present invention, obtained from off-grade resins, exhibits a significantly higher molecular weight. Furthermore, Table 7 shows that this high molecular weight resin exhibits comparable or better physical properties as compared to the off-grade resins alone.

EXAMPLE 4

In this example, a virgin resin is prepared for comparison of the melt flow index. A mixture is prepared from 86.5 parts by weight of 1,4-cyclohexanedimethanol, 47.3 parts by weight of 1,6-hexanediol, 15.5 parts by weight of poly(tetramethylene oxide) glycol (Terathane 650 from DuPont de Nemours) EW 325, 0.47 parts by weight of a commercial anti-oxidant from Ciba Geigy and 0.57 parts by weight of trisnonylphenylphosphite. This mixture is heated to 210° F. (98.9° C.) and dehydrated under vacuum for two hours. This mixture is pumped to a twin screw extruder. Melted MDI is pumped to the extruder at a ratio of 171.5 g for every 100 g of diol mixture. An organotin catalyst is pumped to the extruder at the rate of 0.019 parts per 100 g of diol mixture. The extruder was maintained at 220°±5° C. The extrudate is allowed to cool onto a metal conveyor belt and diced into pellets. After drying at 240° F. (115.6° C.), a representative sample of the pellets is injection molded into test specimens using a four-zone Reed Prentice 10 oz injection molding machine.

The screw torque needed during the feed cycle of the injection molding process using the Reed Prentice injection molding machine, and the molecular weight of the molded parts and melt indices are summarized in Table 8 for Examples 4 and 1C.

TABLE 8

| | Melt Flow Properties of Thermoplastic Polyurethane | | |
|---|---|---|---|
| Example | Molecular Weight of Molded Part Mw | Melt Index (g/10 min) 8700 g, 224° C. | Torque of Screw Reed-Prentice (10 oz) (psig) |
| 4[1] | 436,344 | 5.7 | 1300–1400* |
| 1C | 654,798 | 10.7 | 700–750** |

[1]Not an example of this invention
*Virgin resin
**Regenerated resin of present invention As apparent from the data in Table 8 above, the regenerated thermoplastic polyurethane resin of the present invention, exhibits a significantly lower energy requirement.

What is claimed is:

1. A physical blend of thermoplastic polyurethane resins comprising
    1) a thermoplastic polyurethane resin having free isocyanate groups and a molecular weight of from about 100,000 to about 200,000 with 2a) an off-grade thermoplastic polyurethane resin having free active hydrogen groups and having a molecular weight of from about 30,000 to about 150,000; and/or 2b) a degraded thermoplastic polyurethane resin having a molecular weight of from about 30,000 to about 150,000, wherein the ratio between ingredient 1) to 2) is from about 0.25:1 to about 5:1.

2. The blend of claim 1 wherein the ratio between ingredients 1) and 2) is of from about 1:1 to about 5:1.

3. A regenerated, high molecular weight, thermoplastic polyurethane resin with narrow molecular weight distribution and good physical properties prepared by thermally processing the blend of claim 1.

4. A process for preparing high molecular weight thermally processed parts using low molecular weight resins which have better melt flow properties wherein a blend of thermoplastic polyurethane resins comprising 1) a thermoplastic polyurethane resin having a significant amount of free isocyanate groups and having a molecular weight of from about 100,000 to about 200,000 with 2a) an off-grade thermoplastic polyurethane resin having free active hydrogen groups and having a molecular weight of from about 30,000 to about 150,000; and/or 2b) a degraded thermoplastic polyurethane resin having a molecular weight of from about 30,000 to about 150,000;

at a ratio of ingredient 1) to 2) of 0.25:1 to 5:1, is melted and molded under conditions suitable to produce high molecular weight parts.

* * * * *